Jan. 9, 1940.  G. W. PECK  2,186,493
SAWMILL CARRIAGE OFFSET
Filed Nov. 19, 1937
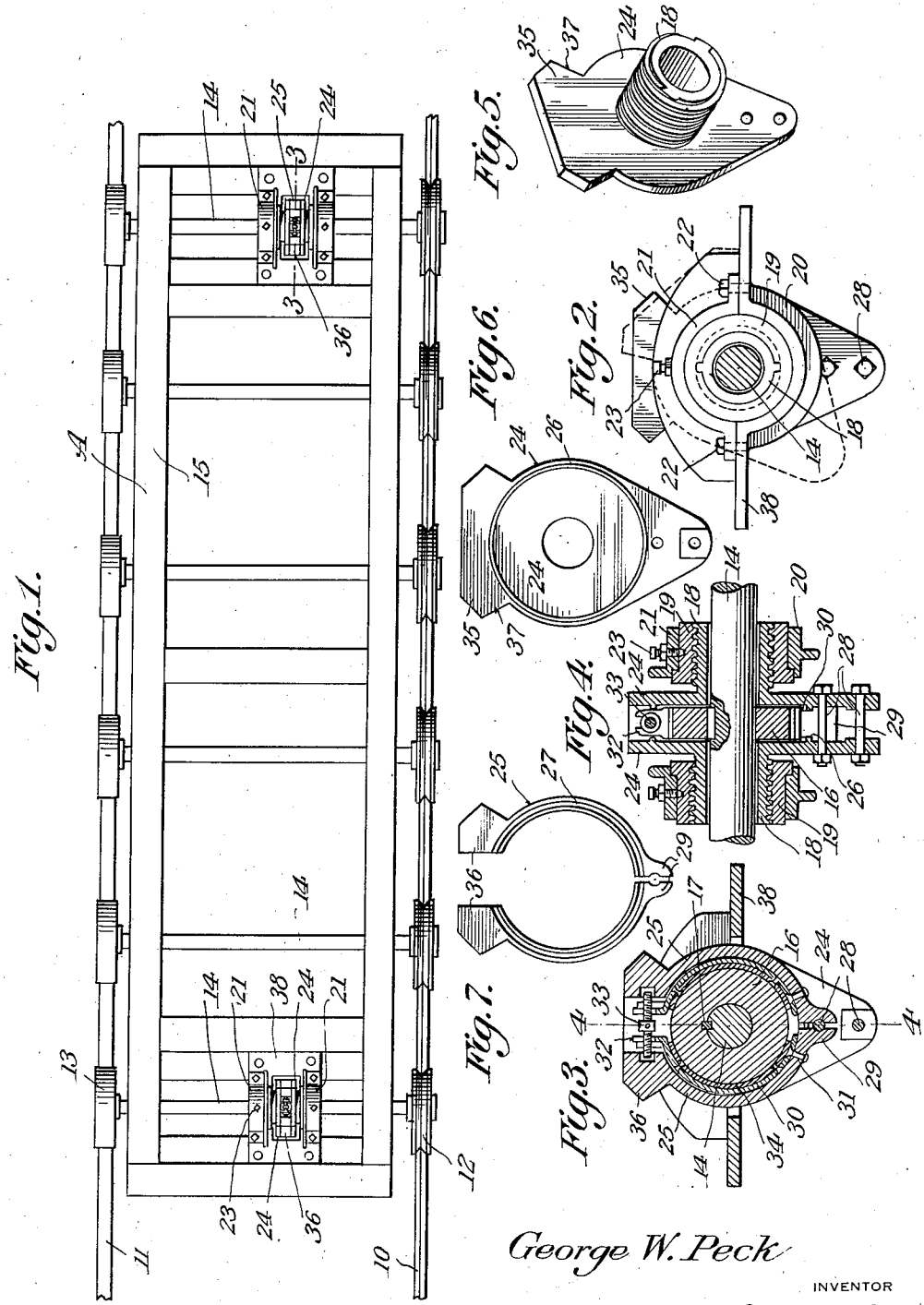
George W. Peck
INVENTOR
BY Victor J. Evans & Co.
ATTORNEYS
WITNESS Patented Jan. 9, 1940

2,186,493

UNITED STATES PATENT OFFICE 2,186,493

SAWMILL CARRIAGE OFFSET

George W. Peck, New River, Tenn.

Application November 19, 1937, Serial No. 175,535

2 Claims. (Cl. 143—109)

The invention relates to a sawmill carriage offset and more especially to a self-adjusting carriage for sawmills.

The primary object of the invention is the provision of a carriage of this character, wherein the same on receding from the saw and on advance toward the saw will be automatically shifted laterally and in this fashion clearing the work when cut by the saw.

Another object of the invention is the provision of a carriage of this character, wherein the lateral shifting thereof on advance toward and receding from the saw is effected automatically and in a novel manner.

A further object of the invention is the provision of a carriage of this character, wherein the mechanism for the automatic lateral shifting of said carriage independent of advancement and the receding thereof is built into the same, being automatic in the working thereof according to the direction of travel of the carriage.

A still further object of the invention is the provision of a carriage of this character, which is simple in construction, thoroughly reliable and efficient in operation, positive in the automatic working thereof, strong, durable, and inexpensive to manufacture and install.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is a top plan view of a carriage constructed in accordance with the invention.

Figure 2 is a fragmentary longitudinal sectional view showing by full lines one position of the lateral shift mechanism for the carriage and by dotted lines another position thereof.

Figure 3 is a vertical sectional view thereof taken on the line 3—3 of Figure 1.

Figure 4 is a sectional view on the line 4—4 of Figure 3.

Figure 5 is a perspective view of one of the elements of the shift mechanism.

Figure 6 is an elevation of the part shown in Figure 5 looking toward the reverse face of the same.

Figure 7 is an elevation of the friction brake band of the said mechanism.

Similar reference characters indicate corresponding parts throughout the several views in the drawing.

Referring to the drawing in detail, A designates generally a sawmill carriage movably supported upon tracks 10 and 11, respectively, these being engaged by track wheels 12 and 13, respectively, common to axles 14, being made fast thereto. The axles 14 are suitably journaled at the under side of the chassis frame 15 of the carriage.

On each of certain of the axles 14, preferably two in number, and those located next to opposite ends of the frame 15 is a brake drum 16 being keyed at 17 to the axle for rotation therewith. At opposite sides of this drum 16 and loose about the axle 14 are externally threaded or screw feed hubs 18, these being engaged in internally threaded collars 19 seated in bearings 20 therefor, each having a removable cap 21 fastened in place by fasteners 22 and this bearing 20 is built in the frame 15 of the carriage A. In the cap 21 of the bearing 20 are set screws 23 which hold fast the collars 19 when seated in these bearings. The bearings 20 are spaced apart at sufficient distance for lateral displacement of the hubs 18 therein without interference so that the carriage frame 15 can be laterally shifted with relation to the axles 14 in a manner presently described.

The hubs 18 have cheeks 24 integrally formed therewith and disposed at opposite sides of the drum 16 which is arranged therebetween while about this drum 16 are opposed brake band carriers 25, each being interfitted with the cheeks 24 through tongue and groove arrangement, the tongue being indicated at 26 and the groove at 27, respectively. The opposite cheeks are fastened together in their interfitted relation with the carriers 25 through bolts 28, one being passed between holding ears 29 on the said carriers 25 and in this manner the latter are prevented from movement relative to the cheeks 24 interfitted therewith. The grooves 27 have the tongues 26 counterseated therein, these tongues being annular and protrude from the faces of the cheeks 24 next to the carriers 25.

The carriers 25 support brake shoes 30, each at one end only being riveted at 31 to its companion carrier 25 while the other end 32 is engaged by an expanding or contracting element 33 so that the shoe disposed about the drum 16 at opposite sides thereof can be adjusted for relative expansion and contraction of the same. These shoes 30 carry brake bands or linings 34 frictionally engageable peripherally with the companion drums 16. The shoes 30 with the brake linings 34 are manually adjusted in their companion pairs so as to effect a light frictional engagement of these linings 34 with the periphery of the companion drum 16. In other words, the shoes 30 are set for frictional contact with their companion drum 16 at all times and this frictional contact is broken or overcome as hereinafter described.

The cheeks 24 and the carriers 25 have formed therewith the upper striker heads 35 and 36, respectively, these matching each other and providing stop shoulders 37 at opposite sides with respect to the rotary axis of the drum 16 for alternate engagement with a bed plate or plank 38 built in the frame 15 of the carriage A. The bands or linings 34 frictionally engage with the drum 16 on the turning thereof in either direction so that the hubs 18 will automatically feed through the collars 19 and through the threaded connections therebetween the frame 15 of the carriage A will be caused to shift laterally to the line of draft in quick fashion due to the character of the screw threaded connections between the said hubs and collars and in this manner the carriage on receding from the saw of the mill will move laterally in a quick manner away from the saw for clearing the cut work thereby from the same. Now on advance movement of the carriage A to the saw in its normal longitudinal traveling motion the frame 15 of said carriage will be shifted laterally to the line of draft of the carriage and in this fashion bringing the work to be cut into proper position to the saw for the cutting thereof.

The feeding action of the hubs 18 in the collars 19 for the lateral displacement of the frame 15 of the carriage A is limited by the striking of the shoulders 37 on the bed plates or planks 38, these shoulders 37 being present at the heads 35 and 36 of both the cheeks 24 and the carriers 25. The contact of the linings of the shoes 30 becomes broken when the shoulder 37 strikes the bed plates or planks 38 according to the travel of the carriage and when this takes place the farther travel in the same direction of said carriage is permitted in that the drum 16 has slippage on the linings 34 of said brake bands and at this movement the carriage 15 will have been shifted to the proper extent for the purposes hereinbefore set forth.

The tongues 26, when fitting in the grooves 27, hold the brake band carriers 25 in proper matched relation to the cheeks 24.

What is claimed is:

1. In a device of the character described, a carriage, axles rotatably journaled transversely of the carriage and having track wheels fixed thereto and located near opposite ends of said carriage, a brake drum fixed to each axle, bearings on opposite sides of each drum on the said carriage, externally screw-threaded hubs loose about the axles, internally threaded collars seated in the bearings and engaged by said hubs, the bearings being spaced from each other for displacement of the hubs, cheeks on the hubs, two-part band carriers about the drums and interfitted with the cheeks through tongue and groove connections, means fastening the cheeks together and interfitted with the carriers, brake shoes connected with each carrier, means accessible between the two parts of the carriers for adjustment of the brake shoes, and striker heads uppermost of the cheeks and carriers, in matched relation to each other and forming stop shoulders at opposite sides of the axis of each drum for engaging a fixed contact upon said carriage in the path of the shoulders next thereto.

2. In a device of the character described, a carriage, axles rotatably journaled transversely of the carriage and having track wheels fixed thereto and located near opposite ends of said carriage, a brake drum fixed to each axle, bearings on opposite sides of each drum on the said carraige, externally screw-threaded hubs loose about the wheels, internally threaded collars seated in the bearings and engaged by said hubs, the bearings being spaced from each other for displacement of the hubs, cheeks on the hubs, two-part band carriers about the drums and interfitted with the cheeks through tongue and groove connections, means fastening the cheeks together and interfitted with the carriers, brake shoes adjustably connected with each carrier, means accessible between the two parts of the carriers for adjustment of the brake shoes, striker heads uppermost of the cheeks and carriers, in matched relation to each other and forming stop shoulders at opposite sides of the axis of each drum for engaging a fixed contact upon said carrier in the path of the shoulder next thereto, caps associated with the bearings for access to the collars, and means fitted with the caps for engagement with the collars to hold the same fixed.

GEORGE W. PECK.